United States Patent [19]

Sekine

[11] Patent Number: 4,867,549
[45] Date of Patent: Sep. 19, 1989

[54] RE-IMAGING OPTICAL SYSTEM

[75] Inventor: Atushi Sekine, Kasukabe, Japan

[73] Assignee: Nikon Corporation, Tokyo, Japan

[21] Appl. No.: 187,045

[22] Filed: Apr. 27, 1988

[30] Foreign Application Priority Data

May 8, 1987 [JP] Japan .................. 62-111893

[51] Int. Cl.⁴ .................. G02B 23/02; G02B 5/04
[52] U.S. Cl. .................. 350/572; 350/569; 350/286
[58] Field of Search .................. 350/572, 561, 286, 537, 350/539, 422, 454, 501, 576, 476, 569

[56] References Cited

U.S. PATENT DOCUMENTS

| 829,121 | 8/1906 | Neumayer et al. | 350/539 |
| 1,468,762 | 9/1923 | Taylor et al. | 350/501 |
| 1,848,788 | 3/1932 | Loeck | 350/572 |
| 2,221,609 | 11/1940 | Sänger | 350/569 |

FOREIGN PATENT DOCUMENTS

| 2215 | 1/1980 | Japan | 350/569 |
| 187311 | 10/1984 | Japan | 350/569 |
| 3060 | of 1910 | United Kingdom | 350/54 |

Primary Examiner—Bruce Y. Arnold
Assistant Examiner—Ronald M. Kachmarik
Attorney, Agent, or Firm—Shapiro and Shapiro

[57] ABSTRACT

A re-imaging optical system for re-imaging a first image formed by an objective lens into a second image of desired size includes, in succession from the object side, a first lens unit which is a field lens constructing the exit pupil of the objective lens and the entrance pupil of the re-imaging optical system so as to be substantially conjugate with each other, a forward sub-unit of a second lens unit, the forward sub-unit having a negative refractive power, an optical member for making the second image formed by the re-imaging optical system erect, and a rearward sub-unit of the second lens unit, the rearward sub-unit having a positive refractive power.

9 Claims, 2 Drawing Sheets

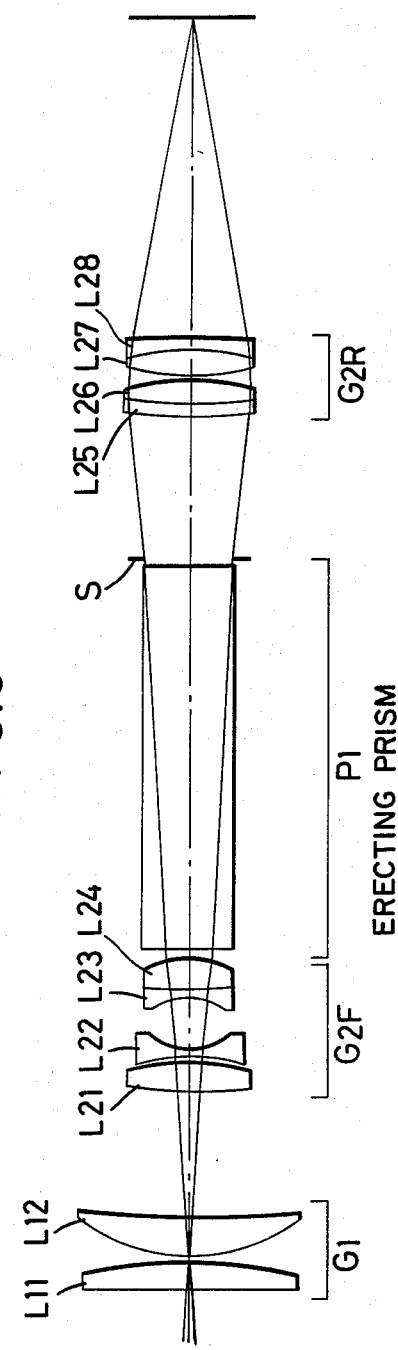

RE-IMAGING OPTICAL SYSTEM

BACKGROUND OF THE INVENTION

1. Field of the Invention

This invention relates to a re-imaging optical system for reducing an image formed by an objective lens, and in particular to a re-imaging optical system suitable for use in the image pickup lens or the like of a television camera used in the gathering of news data (ENG) or the field of program production (EFP).

2. Related Background Art

An an optical system added to an objective lens, there is known a so-called relay optical system for moving an image formed by the objective lens to a desired position and re-imaging it thereat, a converter for changing the combined focal length of a photo-taking lens, or an extender optical system for changing the combined focal length of a zoom lens.

An ENG or EFP camera requires a three-color resolving prism system to be disposed in order to obtain a color image and therefore requires a sufficient back focal length to be secured. Also, in order to prevent the color shading which adversely affects an image by variation of the reflection and transmission characteristics of light entering the dichroic film in the three-color resolving prism, it is necessary to set the exit pupil of the objective lens sufficiently distantly.

Accordingly, to divert a lens for a 35 mm single-lens reflex camera to the ENG or EFP camera, it is necessary to reduce the picture plane by a rear converter while maintaining a sufficient back focal length for disposing the three-color resolving prism, and while providing a desired angle of view and quality of image.

However, the back focal length of a wide angle lens for a 35 mm single-lens reflex camera and of a fish-eye lens is generally of the order of 40 mm and in addition, there is the problem that the back focal length is shortened considerably to reduce the picture plane by the rear converter. Thus, it has been difficult to reduce the image in order to secure the angle of view by the rear converter in which a lens is disposed within a usual back focal length, and to secure a sufficient back focal length and a sufficiently distant exit pupil.

Also, where a re-imaging system is adopted, the image formed thereby is an image resulting from inverting the usual image, and this gives rise to the problem that the finder image is inverted.

SUMMARY OF THE INVENTION

Accordingly, it is an object of the present invention to solve the above-noted problems and to provide a re-imaging optical system which maintains the angle of view of a lens for a 35 mm single-lens reflex camera and a sufficient back focal length and which is compact and high in performance.

The present invention relates to a re-imaging optical system for re-imaging a first image formed by an objective lens into a second image of desired size. The present invention intends to solve the above-noted problems by adopting a construction having a first lens unit G1 which is a field lens constructing the exit pupil of said objective lens and the entrance pupil of said re-imaging optical system so as to be substantially conjugate with each other, a second lens unit comprising a forward sub-unit G2F having a negative refractive power and a rearward sub-unit G2R having a positive refractive power, and an optical member P1 between said forward and rearward sub-units for making a second image formed by said reimaging optical system erect.

Moreover, it will be more effective if the present invention satisfies the following conditions:

$$1.5|\beta| < |\beta_F| < 2.5|\beta| \quad (1)$$

$$0.7 < \frac{e_2}{|f_F| + |f_R|} < 1.5 \quad (2)$$

where
$\beta$: magnification of the re-imaging optical system;
$\beta_F$: magnification of the forward lens sub-unit;
$f_F$: focal length of the forward lens sub-unit;
$f_R$: focal length of rearward lens sub-unit;
$e_2$: the spacing between the image side principal point of the forward lens sub-unit and the object side principal point of the rearward lens sub-unit.

The present invention uses a method of disposing the field lens of the first lens unit on the image surface of the objective lens so that the exit pupil position of the objective lens and the entrance pupil of the re-imaging optical system are substantially conjugate with each other, and re-imaging the image of the objective lens by the re-imaging optical system. If the re-imaging optical system is made into a construction further comprising a second lens unit comprising a forward sub-unit having a negative refractive power and a rearward sub-unit having a positive refractive power, and an optical member which is an erecting prism is disposed between said forward sub-unit and said rearward sub-unit the above-mentioned conditions are satisfied, it will become possible to make the formed finder image erect while maintaining a sufficient back focal length. Those conditions will be described hereinafter.

If the magnification $\beta_F$ of the forward lens sub-unit exceeds the upper limit of condition (1), the focal length of the forward sub-unit will become long and the principal ray will lower and the effective diameters of the forward sub-unit and the erecting prism will become large. To make the effective diameter of the erecting prism large, the optical path length of the prism must be made long, and this will bring about a further reduction in the principal ray. Accordingly, the optical system will become extremely bulky.

If the lower limit of condition (1) is exceeded, the focal length of the forward sub-unit will become short and therefore, the degree of divergence of the on-axis light flux by the forward sub-unit will become great and it will become difficult to secure a predetermined F-number. Therefore, the effective diameter of the prism must be made lrge and as previously described, the optical system will become extremely bulky. Also, the focal length of the forward sub-unit will become short, whereby the entrance pupil position of the reducing optical system will protrude toward the object side. Accordingly, the spacing between the exit pupil position of the objective lens and the entrance pupil position of the re-imaging optical system will become short, and to keep the conjugate relation between these two pupils, the positive refractive power of the field lens must be stronger. As a result, the Petzval sum will become too great and correction of the image surface will become difficult.

If the upper limit of condition (2) is exceeded, the full length of the lens system will become great and the effective diameter of the lens will become large. This may result in bulkiness and increased cost of the optical system, which is not desirable.

If the lower limit of condition (2) is exceeded, the air space between the forward sub-unit and the rearward sub-unit will become small. Therefore, the spacing between the stop and the rearward sub-unit cannot be secured sufficiently and the exit pupil cannot be brought distantly and therefore, color shading will occur, and this is not preferable.

To achieve an image of higher quality, it is necessary to make the Petzval sum sufficiently small and effect good correction of the image surface. For this purpose, a first embodiment of the present invention satisfies the following conditions:

$$n_{23} < 1.6, \ \nu_{23} < 58 \quad (4)$$

$$n_{11} > 1.7, \ n_{12} > 1.7 \quad (5)$$

$$n_{26} > 1.7 \quad (6)$$

where
$n_{23}$: the refractive index of a lens $L_{23}$ for d-line;
$\nu_{23}$: the Abbe number of the lens $L_{23}$ for d-line;
$n_{11}$: the refractive index of a lens $L_{11}$ for d-line;
$n_{12}$: the refractive index of a lens $L_{12}$ for d-line;
$n_{26}$: the refractive index of a lens $L_{26}$ for d-line.

Also, a second embodiment of the present invention used in an image pickup tube for high quality satisfies the following conditions:

$$n_{24} > 1.6, \ \nu_{24} > 58 \quad (7)$$

$$n_{11} > 1.7, \ n_{12} > 1.7 \quad (8)$$

$$n_{28} > 1.7 \quad (9)$$

According to the present invention, a sufficient angle of view and a sufficient back focal length are obtained and therefore, a lens for a 35 mm single-lens reflex camera can be diverted to the use in an ENG or EFP camera. Also, there can be provided a re-imaging optical system in which an erect finder image can be obtained and moreover which is compact and high in performance without deteriorating the image and the quality of the image.

Of course, the present invention is also usable for a lens such as a 35 mm zoom lens as an objective lens.

Other objects, features and effects of the present invention will become more fully apparent from the following detailed description taken in conjunction with the accompanying drawings.

BRIEF DESCRIPTION OF THE DRAWINGS

FIG. 3 shows the construction of another embodiment of the present invention.

DESCRIPTION OF THE PREFERRED EMBODIMENTS

Figure 1:
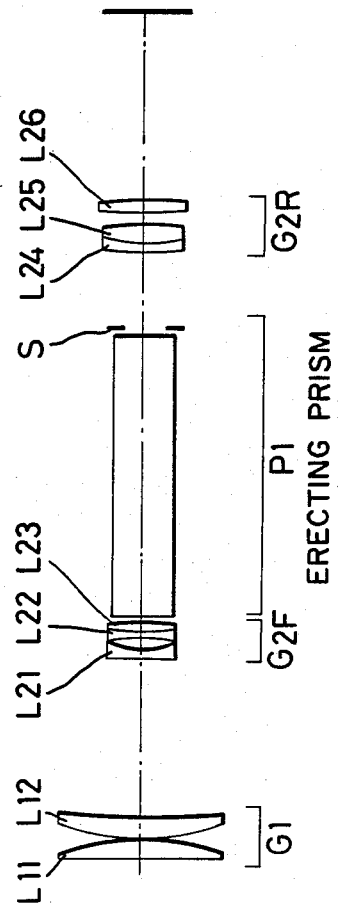
FIG. 1 shows the construction of an optical system according to an embodiment of the present invention.

The re-imaging optical system of the present invention, as shown in FIG. 1, comprises, in succession from the object side, a first lens unit G1 which is a field lens having a positive meniscus lens L11 having its convex surface facing the image side and a positive meniscus lens L12 having its convex surface facing the object side, a second lens unit comprising forward and rearward sub-units, forward sub-unit G2F having a negative lens L21 having its surface of sharper curvature facing the image side, a negative lens L22 and a positive lens L23 joined thereto, an erecting prism P1 for erecting an image surface formed by the re-imaging optical system, a stop S, and rearward sub-unit G2R having a negative lens L24 having its convex surface facing the object side, a positive lens L25 joined thereto and a positive lens L26.

Figure 2:
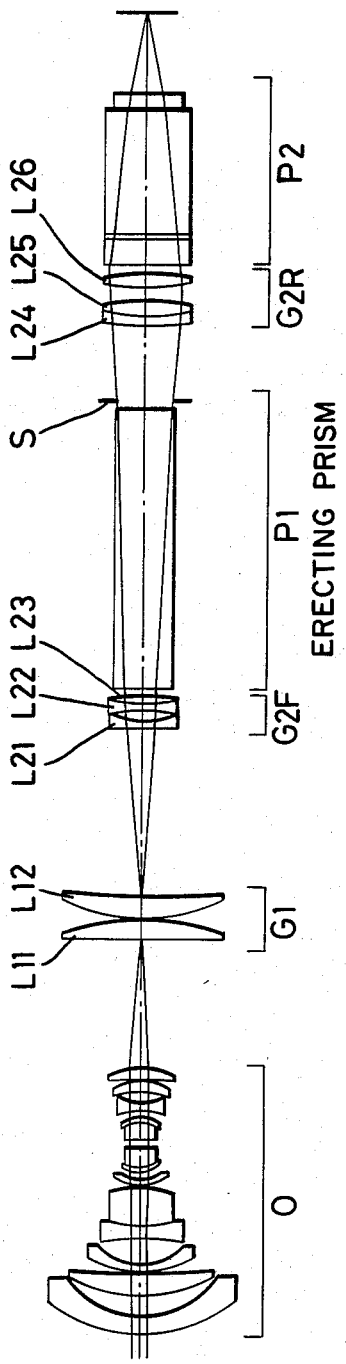
FIG. 2 shows the optical path when the re-imaging optical system of the present invention is mounted between a photo-taking lens (18 mm/F 2.8) for a 35 mm single-lens reflex camera and a three-color resolving prism P2.

In front of the above-described re-imaging optical system as shown in FIG. 2 a lens 0 for a 35 mm single-lens reflex camera having a focal length 18 mm, an F-number 2.8 and an angle of view 100° is used as an objective lens. The first lens unit G1, which is a field lens disposed so that the exit pupil of the objective lens and the entrance pupil of the re-imaging optical system are conjugate with each other, is disposed at a position whereat a good image surface aberration-corrected by said objective lens is formed. By the construction comprising, in succession from the object side, the forward sub-unit G2F having a negative refractive power, the erecting prism P1 and the rearward sub-unit G2R having a positive refractive power, it is possible to keep a sufficient back focal length and a sufficient angle of view while magnification-changing the image by the lens or a 35 mm single-lens reflex camera down to ⅓ of the image size so as to be usable for an image pickup tube for ⅔ inch and moreover obtain an erect image. However, calculation for aberration correction is done for the sake of convenience with the erecting prism replaced with a prism having an optical path length corresponding to the optical path length of the erecting prism and therefore, the image by the erecting prism shown in the optical path diagram of FIG. 2 is not erect. The numerical data of the present invention will be shown below. It should be noted that the spacing between the last surface of the lens for a 35 mm single-lens reflex camera and the first surface of the field lens in the first lens unit is 36.310 mm.

In Table 1 below, there are shown the numerical data of the objective lens O added to the front of the imaging optical system of the present invention, and in Table 2 below, there are shown the numerical data of the imaging optical system of the present invention and a three-color resolving prism added to the rear thereof.

TABLE 1

Focal length: 18 mm
F-number: 2.8
Angle of view: 100°
Bf: 38.39

| No | Radius of curvature r | Center thickness and space d | Refractive index n | Abbe number ν | |
|----|----|----|----|----|----|
| 1  | 41.700  | 2.600  | 1.69680 | 55.61 | Lens for 35 |
| 2  | 21.800  | 6.800  |         |       | mm camera |
| 3  | 36.700  | 6.400  | 1.69680 | 55.61 | |
| 4  | 300.000 | 0.100  |         |       | |
| 5  | 30.700  | 1.000  | 1.78797 | 47.53 | |
| 6  | 14.100  | 7.900  |         |       | |
| 7  | -55.000 | 2.800  | 1.69680 | 55.61 | |
| 8  | 25.000  | 11.400 | 1.57099 | 51.03 | |
| 9  | -26.100 | 0.100  |         |       | |
| 10 | 20.900  | 0.900  | 1.69680 | 55.61 | |
| 11 | 9.140   | 2.460  |         |       | |
| 12 | 17.700  | 1.000  | 1.73350 | 51.11 | |

TABLE 1-continued

| No. | Radius of curvature r | Center thickness and space d | Refractive index n | Abbe number ν | |
|---|---|---|---|---|---|
| 13 | 10.412 | 5.800 | 1.64831 | 33.77 | |
| 14 | ∞ | 1.600 | | | |
| 15 | ∞ | 5.300 | 1.62041 | 60.29 | |
| 16 | −8.900 | 1.050 | 1.62004 | 36.34 | |
| 17 | −12.830 | 2.100 | | | |
| 18 | −16.830 | 3.500 | 1.75692 | 31.70 | |
| 19 | 37.900 | 1.300 | | | |
| 20 | −60.000 | 2.800 | 1.49782 | 82.56 | |
| 21 | −14.900 | 0.100 | | | |
| 22 | −600.000 | 2.800 | 1.51860 | 70.08 | |
| 23 | −22.715 | 38.39 | | | |

TABLE 2

| No. | Radius of curvature r | Center thickness and space d | Refractive index n | Abbe number ν | |
|---|---|---|---|---|---|
| 1 | −1661.828 | 5.400 | 1.90265 | 35.76 | |
| 2 | −64.690 | 0.100 | | | $G_1$ |
| 3 | 44.991 | 5.800 | 1.90265 | 35.76 | |
| 4 | 158.416 | 46.342 | | | |
| 5 | −265.897 | 1.000 | 1.51118 | 50.91 | |
| 6 | 15.822 | 3.500 | | | |
| 7 | −40.800 | 1.000 | 1.51118 | 50.91 | $G_{2F}$ |
| 8 | 24.101 | 3.000 | 1.90265 | 35.76 | |
| 9 | −93.381 | 0.996 | | | |
| 10 | ∞ | 76.620 | 1.56883 | 56.04 | $P_1$ |
| 11 | ∞ | 2.000 | | | |
| 12 | 107.999 | 1.700 | 1.86074 | 23.00 | |
| 13 | 29.543 | 5.200 | 1.67025 | 57.58 | |
| 14 | −100.572 | 3.670 | | | $G_{2R}$ |
| 15 | 70.377 | 3.000 | 1.90265 | 35.76 | |
| 16 | −138.283 | 3.228 | | | |
| 17 | ∞ | 6.500 | 1.51680 | 64.12 | 3-color |
| 18 | ∞ | 1.500 | 1.54440 | 70.70 | resolv- |
| 19 | ∞ | 33.000 | 1.60342 | 38.12 | ing |
| 20 | ∞ | 4.000 | 1.50657 | 62.00 | prism |
| 21 | ∞ | 21.486 | | | |

$\beta = -0.26416$  $\beta_F = 0.54663$
$e_2 = 90.70367$  $f_F = -55.58730$  $f_R = 37.76313$
$$\frac{e_2}{|f_F| + |f_R|} = 0.97165$$

Another embodiment of the present invention will now be described with reference to FIG. 3. The second embodiment presupposes that it is used in an image pickup tube for 1 inch, i.e., an image pickup tube for high quality, and what is used as the objective lens of the present embodiment is a lens similar to that of the first embodiment. The second embodiment comprises, in succession from the object side, a first lens unit G1, a forward sub-unit G2F of a second lens unit, an erecting prism P1, a stop S and a rearward sub-unit G2R of the second lens unit, and the construction in the first lens unit G1 is a field lens similar to that in the first embodiment. The forward sub-unit G2F comprises, in succession from the object side, a biconvex positive lens L21, a biconcave negative lens L22, a negative lens L23 and a positive lens L24 joined thereto. The rearward sub-unit G2R comprises, in succession from the object side, a negative lens L25, a positive lens L26 joined thereto, a positive lens L27 and a positive lens L28 joined thereto. Table 3 below shows the numerical data of the present embodiment. It should be noted that the spacing between the last surface of the objective lens and the first surface of the field lens in the first lens unit of the re-imaging optical system is 34.81 mm.

However, calculation for aberration correction is done for the sake of convenience with the erecting prism replaced with a prism having an optical path length corresponding to the optical path length of the erecting prism and therefore, the image by the erecting prism shown in the optical path diagram of FIG. 3 is not erect.

TABLE 3

| No. | Radius of curvature r | Center thickness and space d | Refractive index n | Abbe number ν | |
|---|---|---|---|---|---|
| 1 | 1555.419 | 5.50 | 1.90265 | 35.7 | |
| 2 | −103.087 | 1.00 | | | $G_1$ |
| 3 | 41.840 | 8.50 | 1.90265 | 35.7 | |
| 4 | 432.930 | 25.50 | | | |
| 5 | 93.787 | 6.00 | 1.86074 | 23.0 | |
| 6 | −51.472 | 1.50 | | | |
| 7 | −30.505 | 1.50 | 1.51680 | 64.1 | |
| 8 | 13.863 | 10.00 | | | $G_{2F}$ |
| 9 | −14.181 | 1.50 | 1.72825 | 28.3 | |
| 10 | 93.203 | 7.00 | 1.79668 | 45.4 | |
| 11 | −18.807 | 1.50 | | | |
| 12 | ∞ | 79.00 | 1.90265 | 35.7 | $P_1$ |
| 13 | ∞ | 31.10 | | | |
| 14 | 169.708 | 2.50 | 1.61266 | 44.4 | |
| 15 | 108.088 | 5.00 | 1.49782 | 82.6 | |
| 16 | −46.362 | .70 | | | $G_{2R}$ |
| 17 | 53.378 | 5.00 | 1.59319 | 67.9 | |
| 18 | −44.517 | 2.00 | 1.84042 | 43.3 | |
| 19 | −272.067 | 13.64 | | | |
| 20 | ∞ | 1.50 | 1.54440 | 70.7 | 3-color |
| 21 | ∞ | 7.00 | 1.51680 | 64.1 | resolv- |
| 22 | ∞ | 50.50 | 1.69680 | 55.6 | ing |
| 23 | ∞ | 10.00 | 1.51680 | 64.1 | prism |
| 24 | ∞ | 10.23 | | | |

$\beta = -0.3697$  $\beta_F = 0.673$  $e_2 = 105.4162$
$f_F = -57.3$  $f_R = 45.992$
$$\frac{e_2}{|f_F| + |f_R|} = 1.02056$$

What is claimed is:

1. A re-imaging optical system for re-imaging a first image formed by an objective lens into a second image of desired size, including, in succession from the object side, a first lens unit which is a field lens constructing the exit pupil of said objective lens and the entrance pupil of said re-imaging optical system so as to be substantially conjugate with each other, a second lens unit comprising forward and rearward sub-units, said forward sub-unit having a negative refractive power and said rearward sub-unit having a positive refractive power, and an optical member for making said second image formed by said re-imaging optical system erect, said re-imaging optical system satisfying the following condition:

$$1.5|\beta| < |\beta_F| < 2.5|\beta|,$$

where
 $\beta$: magnification of said re-imaging optical system;
 $\beta_F$: magnification of said forward sub-unit.

2. A re-imaging optical system according to claim 1, further satisfying the following condition:

$$0.7 < \frac{e_2}{|f_F| + |f_R|} < 1.5, \qquad (2)$$

where
 $f_F$: focal length of said forward sub-unit;
 $f_R$: focal length of said rearward lens sub-unit;
 $e_2$: the spacing between the image side principal point of said forward sub-unit and the object side principal point of said second rearward lens sub-unit.

3. A re-imaging optical system for re-imaging a first image formed by an objective lens into a second image of desired size, including, in succession from the object side, a first lens unit which is a field lens constructing the exit pupil of said objective lens and the entrance pupil of said re-imaging optical system so as to be substantially conjugate with each other, a second lens unit comprising forward and rearward sub-units, said forward sub-unit having a negative refractive power and said rearward sub-unit having a positive refractive power, and an optical member for making said second image formed by said re-imaging optical system erect, said re-imaging optical system being characterized by the following data:

| No. | Radius of curvature r | Center thickness and space d | Refractive index n | Abbe number $\nu$ | |
|---|---|---|---|---|---|
| 1 | −1661.828 | 5.400 | 1.90265 | 35.76 | |
| 2 | −64.690 | 0.100 | | | $G_1$ |
| 3 | 44.991 | 5.800 | 1.90265 | 35.76 | |
| 4 | 158.416 | 46.342 | | | |
| 5 | −265.897 | 1.000 | 1.51118 | 50.91 | |
| 6 | 15.822 | 3.500 | | | |
| 7 | −40.800 | 1.000 | 1.51118 | 50.91 | $G_{2F}$ |
| 8 | 24.101 | 3.000 | 1.90265 | 35.76 | |
| 9 | −93.381 | 0.996 | | | |
| 10 | ∞ | 76.620 | 1.56883 | 56.04 | $P_1$ |
| 11 | ∞ | 2.000 | | | |
| 12 | 107.999 | 1.700 | 1.86074 | 23.00 | |
| 13 | 29.543 | 5.200 | 1.67025 | 57.58 | |
| 14 | −100.572 | 3.670 | | | $G_{2R}$ |
| 15 | 70.377 | 3.000 | 1.90265 | 35.76 | |
| 16 | −138.283 | 3.228 | | | |

$\beta = -0.26416$   $\beta_F = 0.54663$
$e_2 = 90.70367$   $f_F = -55.58730$   $f_R = 37.76313$ $$\frac{e_2}{|f_F| + |f_R|} = 0.97165$$

4. A re-imaging optical system for re-imaging a first image formed by an objective lens into a second image of desired size, including, in succession from the object side, a first lens unit which is a field lens constructing the exit pupil of said objective lens and the entrance pupil of said re-imaging optical system so as to be substantially conjugate with each other, a second lens unit comprising forward and rearward sub-units, said forward sub-unit having a negative refractive power and said rearward sub-unit having a positive refractive power, and an optical member for making said second image formed by said re-imaging optical system erect, said re-imaging optical system being characterized by the following data:

| No. | Radius of curvature r | Center thickness and space d | Refractive index n | Abbe number $\nu$ | |
|---|---|---|---|---|---|
| 1 | 1555.419 | 5.50 | 1.90265 | 35.7 | |
| 2 | −103.087 | 1.00 | | | $G_1$ |
| 3 | 41.840 | 8.50 | 1.90265 | 35.7 | |
| 4 | 432.930 | 25.50 | | | |
| 5 | 93.787 | 6.00 | 1.86074 | 23.0 | |
| 6 | −51.472 | 1.50 | | | |
| 7 | −30.505 | 1.50 | 1.51680 | 64.1 | $G_{2F}$ |
| 8 | 13.863 | 10.00 | | | |
| 9 | −14.181 | 1.50 | 1.72825 | 28.3 | |
| 10 | 93.203 | 7.00 | 1.79668 | 45.4 | |
| 11 | −18.807 | 1.50 | | | |
| 12 | ∞ | 79.00 | 1.90265 | 35.7 | $P_1$ |
| 13 | ∞ | 31.10 | | | |
| 14 | 169.708 | 2.50 | 1.61266 | 44.4 | |
| 15 | 108.088 | 5.00 | 1.49782 | 82.6 | |
| 16 | −46.362 | .70 | | | $G_{2R}$ |

-continued

| No. | Radius of curvature r | Center thickness and space d | Refractive index n | Abbe number $\nu$ | |
|---|---|---|---|---|---|
| 17 | 53.378 | 5.00 | 1.59319 | 67.9 | |
| 18 | −44.517 | 2.00 | 1.84042 | 43.3 | |
| 19 | −272.067 | 13.64 | | | |
| 20 | ∞ | 1.50 | 1.54440 | 70.7 | 3-color |
| 21 | ∞ | 7.00 | 1.51680 | 64.1 | resolv- |
| 22 | ″ | 50.50 | 1.69680 | 55.6 | ing |
| 23 | ∞ | 10.00 | 1.51680 | 64.1 | prism |
| 24 | ∞ | 10.23 | | | |

$\beta = -0.3697$   $\beta_F = 0.673$   $e_2 = 105.4162$
$f_F = -57.3$   $f_R = 45.992$ $$\frac{e_2}{|f_F| + |f_R|} = 1.02056$$

5. A re-imaging optical system for re-imaging a first image formed by an objective lens into a second image, wherein said re-imaging optical system is detachable from an apparatus which transforms said second image into a picture signal, comprising:
  a first lens unit, which has a positive refractive power, for constructing the exit pupil of said objective lens and the entrance pupil of said re-imaging optical system so as to be substantially conjugated with each other;
  a second lens unit having forward and rearward sub-units, said forward sub-unit having a negative refractive power and said rearward sub-unit having a positive refractive power; and
  an optical system disposed between said forward and said rearward sub-units;
  said first lens unit, said forward sub-unit, said optical system, and said rearward sub-unit being disposed in succession from the object side, said optical system causing said second image formed by said re-imaging optical system to be erect with respect to said first image without re-imaging said first image into another image in the optical path between said forward and said rearward sub-units.

6. A re-imaging optical system according to claim 5, wherein said optical system is an erecting prism.

7. A re-imaging optical system according to claim 6, wherein said re-imaging optical system reduces said first image to said second image.

8. A re-imaging optical system for re-imaging a first image formed by an objective lens into a second image to which said first image is reduced comprising:
  a first lens unit, which has a positive refractive power, for constructing the exit pupil of said objective lens and the entrance pupil of said re-imaging optical system so as to be substantially conjugate with each other;
  a second lens unit having forward and rearward sub-units, said forward sub-unit having a negative refractive power and said rearward sub-unit having a positive refractive power; and
  an optical system disposed between said forward and said rearward sub-units;
  said first lens unit, said forward sub-unit, said optical system, and said rearward sub-unit being disposed in succession from the object side, said optical system causing said second image formed by said re-imaging optical system to be erect with respect to said first image without re-imaging said first image into another image in the optical path between said forward and said rearward sub-units.

9. A re-imaging optical system according to claim 8, wherein said optical system is an erecting prism.

* * * * *